US009142086B2

(12) United States Patent
Porco

(10) Patent No.: US 9,142,086 B2
(45) Date of Patent: Sep. 22, 2015

(54) METHOD AND SYSTEM FOR ENABLING GAMING VIA A MOBILE DEVICE

(75) Inventor: Gino Porco, Etobicoke (CA)

(73) Assignee: Mobilotto Systems, Inc., Toronto (CA)

( * ) Notice: Subject to any disclaimer, the term of this patent is extended or adjusted under 35 U.S.C. 154(b) by 135 days.

(21) Appl. No.: 13/125,095

(22) PCT Filed: Oct. 20, 2009

(86) PCT No.: PCT/CA2009/001482
§ 371 (c)(1), (2), (4) Date: Jul. 22, 2011

(87) PCT Pub. No.: WO2010/045716
PCT Pub. Date: Apr. 29, 2010

(65) Prior Publication Data
US 2011/0269436 A1 Nov. 3, 2011

Related U.S. Application Data

(60) Provisional application No. 61/106,988, filed on Oct. 21, 2008, provisional application No. 61/183,578, filed on Jun. 3, 2009.

(51) Int. Cl.
*H04L 29/06* (2006.01)
*A63F 9/24* (2006.01)
*G07F 17/32* (2006.01)

(52) U.S. Cl.
CPC ............ *G07F 17/3237* (2013.01); *G07F 17/32* (2013.01)

(58) Field of Classification Search
USPC ............ 455/404.2, 414.2–414.3, 418–422.1, 455/432.3, 456.1–456.6, 457, 550.1, 552.1, 455/553.1, 556.1, 556.2, 557, 566; 463/39–42
See application file for complete search history.

(56) References Cited

U.S. PATENT DOCUMENTS

| | | | | |
|---|---|---|---|---|
| 7,035,626 | B1 * | 4/2006 | Luciano, Jr. | 455/414.1 |
| 2003/0224855 | A1 * | 12/2003 | Cunningham | 463/41 |
| 2004/0111369 | A1 * | 6/2004 | Lane et al. | 705/40 |
| 2006/0095790 | A1 | 5/2006 | Nguyen et al. | |
| 2008/0311893 | A1 * | 12/2008 | Liu et al. | 455/414.2 |
| 2009/0149200 | A1 * | 6/2009 | Jayasinghe et al. | 455/456.3 |
| 2010/0046406 | A1 * | 2/2010 | Annamalai et al. | 370/310 |

* cited by examiner

*Primary Examiner* — San Htun
(74) *Attorney, Agent, or Firm* — Sabeta IP

(57) ABSTRACT

A method and system for enabling gaming via a mobile device are provided. A request is received from the mobile device to participate in gaming. Primary location information determined by the mobile device for the location of the mobile device is received with the request. The primary location information is verified with secondary location information for the geolocation of the mobile device determined using a location system external to said mobile device. Participation of the mobile device in a game is enabled if the primary location information is verified and if the mobile device at the location identified by the primary location information is eligible for the game.

21 Claims, 7 Drawing Sheets

METHOD AND SYSTEM FOR ENABLING GAMING VIA A MOBILE DEVICE

FIELD OF THE INVENTION

The present invention relates generally to the field of gaming. In particular, it relates to a method and system for enabling gaming via a mobile device.

BACKGROUND OF THE INVENTION

Gambling, or "gaming", is known. Given the contentious nature of gaming, different nations and even states/provinces/regions, all hereinafter referred to as jurisdictions, have individually enacted legislation to define what gaming can occur within that jurisdiction. In some jurisdictions, betting on the outcomes of sports matches, among other things, is allowed, whereas in other jurisdictions, it is prohibited. Perhaps more critical is the case wherein various types of gaming are expressly forbidden in certain jurisdictions and can bear severe penalties.

In many cases, jurisdictions control and operate state-run gaming. For example, the government of the province of Ontario in Canada has created the Ontario Lottery and Gaming Commission to oversee the operation of lotteries and other forms of gaming. The sale of lottery tickets, as well as other gaming tickets, is generally restricted to the jurisdiction, and the sale of lottery and other gaming tickets from other jurisdictions can be prohibited. As lottery tickets are, or have been, printed documents, they have traditionally been sold from specific physical locations such as convenience stores and lottery kiosks. Such an arrangement facilitates the compliance with jurisdictional rules as the convenience stores and lottery kiosks only sell lottery and other gaming tickets for the particular jurisdiction(s) in which they are physically located.

Recently, proposals have been made for the implementation of mobile lottery and gaming systems that allow a person to participate in lotteries and other gaming via a mobile device. A person who is gaming in one form or another shall be hereinafter referred to as a "player". The convergence of mobile devices towards certain platforms has facilitated the development of a few versions of software for mobile devices that can be deployed across a large portion of existing mobile devices.

For example, United States Patent Application Publication No. 2005/0215306 entitled "LOTTERY METHOD AND APPARATUS" to O'Donnell et al. discloses a method and apparatus for purchasing a lottery ticket using a mobile device. The mobile device is in communication with a server-based master game matrix that stores information on relevant lottery games and is controlled by a particular lottery authority.

In keeping with jurisdictional lottery rules, the location of the mobile device would need to be validated to ensure that the player is physically located in the correct jurisdiction in order to participate in gaming for that jurisdiction.

United States Patent Application 2007/0321785 entitled "SYSTEM AND METHOD FOR CONVENIENCE GAMBLING" to Amaitis et al. discloses such a location verification feature, for mobile gambling, that permits or disallows gaming from a remote location depending upon whether or not the location meets one or more criteria, including whether the location is within a pre-defined area in which gaming is permitted by law. The location verification includes a feature where the location determination is carried out periodically, such that if a user leaves a prescribed area while engaged in a gambling activity for a defined period of time, the gambling activity will be stopped.

United States Patent Application Publication No. 2009/0042633 entitled "SYSTEM AND METHOD FOR OPERATING ON-LINE GOVERNMENTAL LOTTERY GAMES" to Yacenda discloses a method for facilitating governmental lottery play and includes determining whether a mobile player terminal is located within a lottery jurisdiction based on transmitted location information. Once the location is verified, and accepted, the purchase of the lottery ticket is completed. If the location information indicates that the mobile player terminal is outside of the lottery jurisdiction, the purchase of the lottery ticket is prevented. The location information may be acquired using global positioning system ("GPS") or cellular telephone localization.

U.S. Pat. No. 7,510,474 entitled "LOCATION BASED MOBILE WAGERING SYSTEM" to Carter, Sr., discloses a system for providing access to casino gaming and sports booking which enables a player to place wagers based on the jurisdiction of play via a mobile gaming unit. According to one described embodiment, the mobile gaming unit is tracked by a position location system, and may be activated, or deactivated according to the local gambling restrictions. Among other features, the document identifies a server-based "jurisdiction profile" which may include information relative to gaming restrictions, tax rates, and tax exchange agreements for a jurisdiction from which a gambler places a bet.

Such systems, however, are susceptible to tampering and location-spoofing. GPS is not a secure system, in that signals are not verified via conventional GPS units. As a result, GPS signals can be spoofed, thereby enabling a player to have the GPS module of his mobile device believe that it is, in fact, in a different location. In this manner, a player would be able to participate in gaming that is prohibited in his location.

It is an object of the invention to provide a novel method and system for enabling gaming via a mobile device.

SUMMARY OF THE INVENTION

In accordance with an aspect of the invention, there is provided a method for enabling gaming via a mobile device, comprising:

receiving a request from said mobile device to participate in gaming;

receiving primary location information determined by said mobile device for the location of said mobile device;

verifying said primary location information with secondary location information for the location of said mobile device determined using a location system external to said mobile device; and enabling said mobile device to participate in a game if said primary location information is verified and if said mobile device at the location identified by the primary location information is eligible for said game.

The primary location information can be determined by the mobile device using global positioning system satellite signals. Alternatively, the primary location information can be determined by the mobile device using at least one cellular communications tower with which the mobile device is in communication.

The secondary location information can be determined using cellular communications tower triangulation. Alternatively, the secondary location information can be determined using the identity and location of a cellular communications tower with which the mobile device is in communication, or using the location of the first network node along a route through which a communication from the mobile device travels for which the location is known.

The verifying of the primary location information can be optionally performed.

The enabling can be conditional on the age of the user of the mobile device, or on the user of the mobile device being free of addiction to gaming.

In accordance with another aspect of the invention, there is provided a system for enabling gaming via a mobile device, comprising:

at least one server providing access to a game to users in a jurisdiction, said at least one server having a first communications interface for receiving a request for access to said game from a mobile device, said request including first location information about the geolocation of said mobile device, said at least one server verifying said primary location information with secondary location information for the location of the mobile device determined using a location system external to said mobile device, and enabling said mobile device to participate in a game if said primary location information is verified and if said mobile device at the location identified by the primary location information is eligible for said game.

The primary location information can be determined by the mobile device using global positioning system satellite signals. Alternatively, the primary location information can be determined by the mobile device using at least one cellular communications tower with which the mobile device is in communication.

The secondary location information can be determined using cellular communications tower triangulation. Alternatively, the secondary location information can be determined using the identity and location of a cellular communications tower with which the mobile device is in communication, or using the location of the first network node along a route through which a communication from the mobile device travels for which the location is known.

The verification of the primary location information can be optionally performed by the system.

The at least one server can enable the mobile device to participate in the game conditional on the age of a user of the mobile device, or conditional on a user of the mobile device being free of addiction to gaming.

In accordance with a further aspect of the invention, there is provided a method for enabling gaming via a mobile device, comprising:

receiving a request from said mobile device to participate in gaming;

receiving primary location information determined by said mobile device for the location of said mobile device, if participation in said gaming is restricted by location;

verifying said primary location information with secondary location information for the location of said mobile device determined using a location system external to said mobile device, if participation in said gaming is restricted by location; and restricting said mobile device from participating in a game if said primary location information is not verified and if participation in said gaming is restricted by location.

The method can further include restricting the mobile device from participating in the game if a user of the mobile device is below an age limit, or if a user of the mobile device is addicted to gaming.

Other and further advantages and features of the invention will be apparent to those skilled in the art from the following detailed description thereof, taken in conjunction with the accompanying drawings.

BRIEF DESCRIPTION OF THE DRAWINGS

Embodiments will now be described, by way of example only, with reference to the attached Figures, wherein.

DETAILED DESCRIPTION OF THE EMBODIMENTS

The invention relates generally to a method and system for enabling gaming via a mobile device. The mobile device determines primary location information corresponding to the location of the mobile device, and communicates the primary location information to the system. The system can then determine secondary location information for the location of the mobile device. The secondary location information is determined using a geolocation system external to the mobile device, and is used to verify the primary location information. The system then enables the mobile device to participate in a game if the primary location information is verified and if the mobile device at the location identified by the primary location information is eligible for the game.

By obtaining secondary location information from a geolocation system external to the mobile device, the primary location information determined and reported by the mobile device can be verified to detect tampering or otherwise inaccurate geolocation information.

Figure 1:
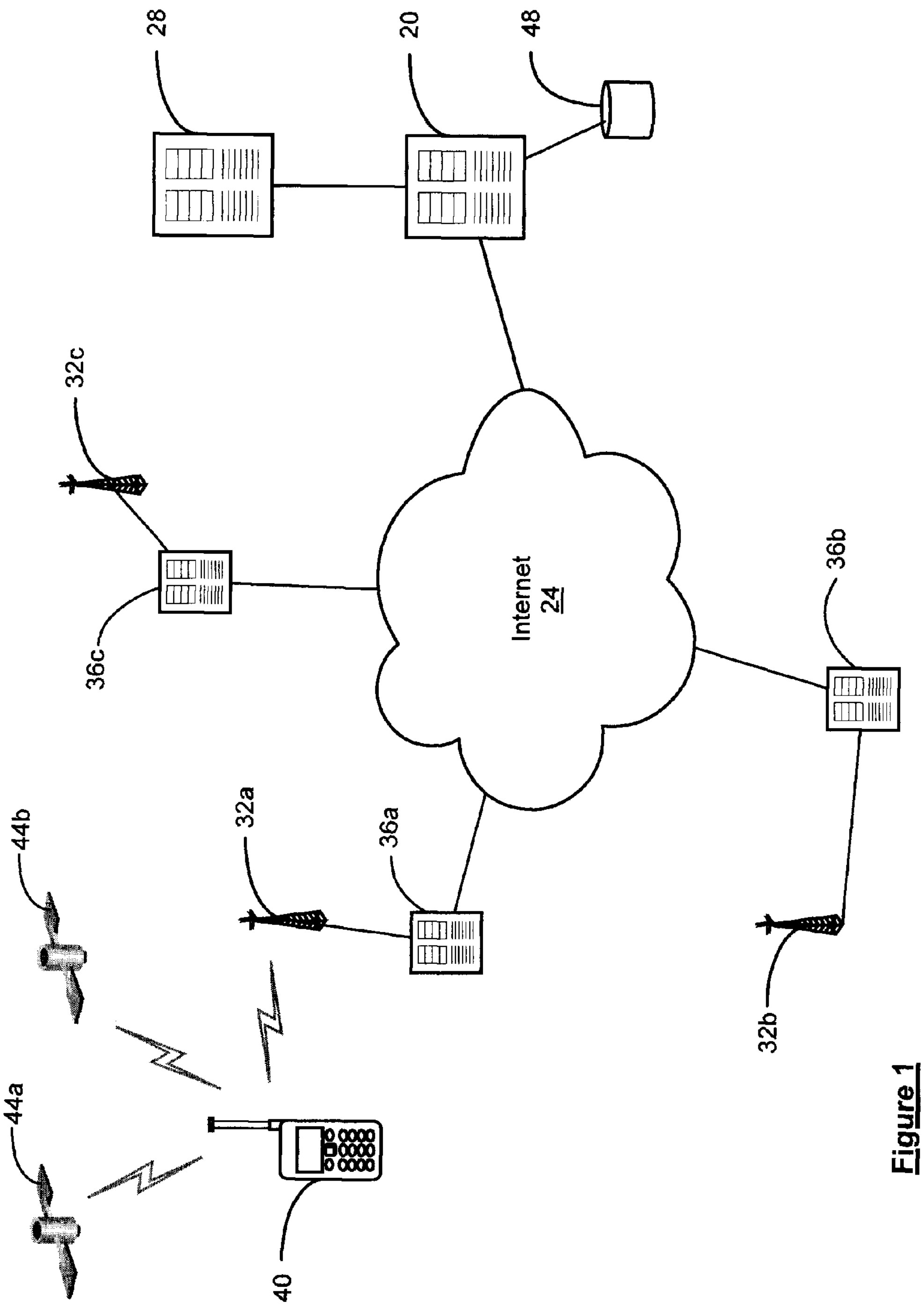
FIG. 1 is a schematic representation of a system for enabling gaming via a mobile device and its operating environment in accordance with an embodiment thereof.

A system for enabling gaming via a mobile device in accordance with an aspect of the invention is shown at 20 in FIG. 1. The system 20 enables participation in one or more games via mobile devices, and is coupled to the Internet 24. In the particular illustrated example, the system 20 enables the purchase of one or more types of lottery tickets for a particular jurisdiction. The system 20 is a single server in this embodiment, but can be two or more servers that are either located at a single site or are distributed, and cooperatively provide the required functionality as will be described.

The system 20 is also in communication with an issuing party 28 that oversees the operation of the lotteries for which the system 20 sells tickets. The issuing party 28 can oversee the sale of some or all of the types of lottery tickets via other channels, such as their printing and sale at convenience stores or the like. As with other types of games, the sale of tickets for the lotteries overseen by the issuing party 28 may only be sold in a particular jurisdiction.

A number of cellular communication towers 32_a_, 32_b_, 32_c_ are also in communication with the Internet 24 via corresponding Internet Protocol ("IP") gateways 36_a_, 36_b_, 36_c_ respectively. The IP gateways 36 are typically located geographically proximate to the corresponding cellular communication towers 32. A mobile device 40 is in communication with one of the cellular communication towers 32_a_, and thus, indirectly with the system 20 via the IP gateway 36_a_ and the Internet 24.

In the particular described example, the mobile device 40 is assigned an internal address or other identifier by the cellular communication service provider (also referred to as a carrier) that operates the cellular communication tower 32*a* with which the mobile device 40 is in communication. In order to communicate with the system 20, communications from the mobile device 40 are sent to the IP gateway 36*a* via the cellular communication tower 32*a*. In turn, the IP gateway 36*a* uses network address translation or another similar system to translate the communications and then forwards the communications from the mobile device 40 to the system 20 over the Internet 24 via IP version 4, the standard addressing system used for identifying devices on the Internet 24. Each translated communication from the IP gateway 36*a* bears the particular IP address of the IP gateway 36*a* and a port number that corresponds to the particular application executing on the mobile device 40. Communications sent by the system 20 to the lottery application executing on the mobile device 40 are sent to the IP address of the IP gateway 36*a* at the port identified in the communication from the IP gateway 36*a* for the mobile device 40. The IP gateway 36*a*, in turn, translates the address in the communication from the system 20 to that by which the mobile device 40 is known internally within the cellular communication service provider's network.

The mobile device 40 is also in receipt of signals from a plurality of global positioning system ("GPS") satellites 45A, 45B for purposes of geolocation. While only two GPS satellites 44 are shown, it will be understood by those skilled in the art that the mobile device 40 will likely be in receipt of the signals from many GPS satellites 44.

The system 20 also is in communication with an IP geolocation database 48. The IP geolocation database that stores known geolocations for certain IP addresses.

Figure 2:
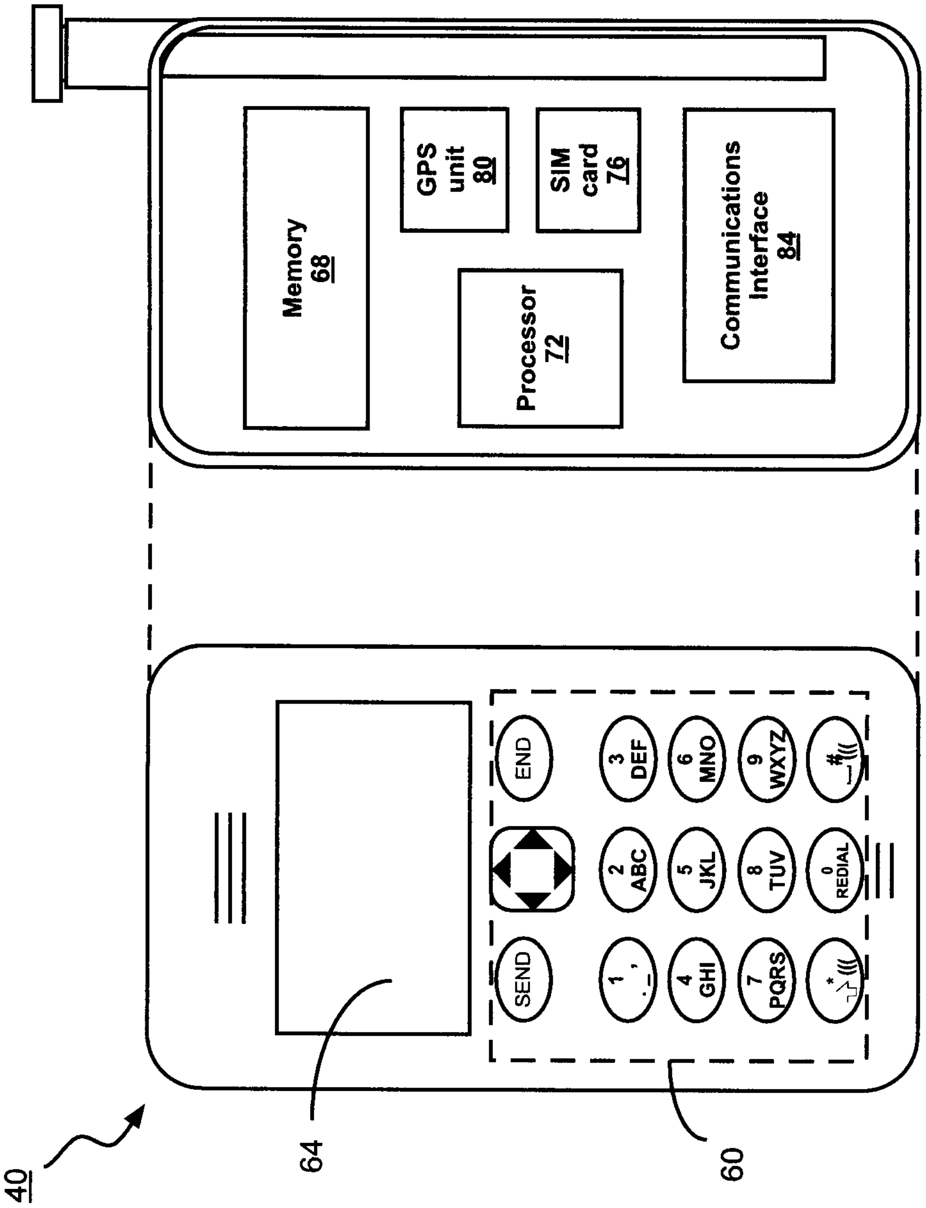
FIG. 2 is a schematic representation of a mobile device for use with the system of FIG. 1.

Referring to FIG. 2, a number of components of the mobile device 40 are shown. As illustrated, in this embodiment, the mobile device 40 is a typical mobile phone having basic functions. The mobile device 40 has an input interface 60 for receiving input from a user, and a display 64 is provided for presenting information visually to the user. The mobile device 40 also includes memory 68 for storing an operating system that controls the main functionality of the mobile device 40, along with a number of applications that are run on the mobile device 40, and data. A processor 72 executes the operating system and applications. A subscriber identification module ("SIM") card 76 provides additional memory for storing applications and data, and has a microprocessor for executing them. Additionally, the SIM card 76 has a unique hardware identification code that permits identification of the mobile device 40. When installed, the SIM card 76 forms part of the mobile device 40. A GPS unit 80 operates to receive signals from GPS satellites 44 to determine the geolocation of the mobile device 40. Other types of mobile devices can have encrypted device memory in place of the SIM card 76, which offers the equivalent functionality. A communications interface 80 permits communications with a cellular network for voice and data.

Figure 3:
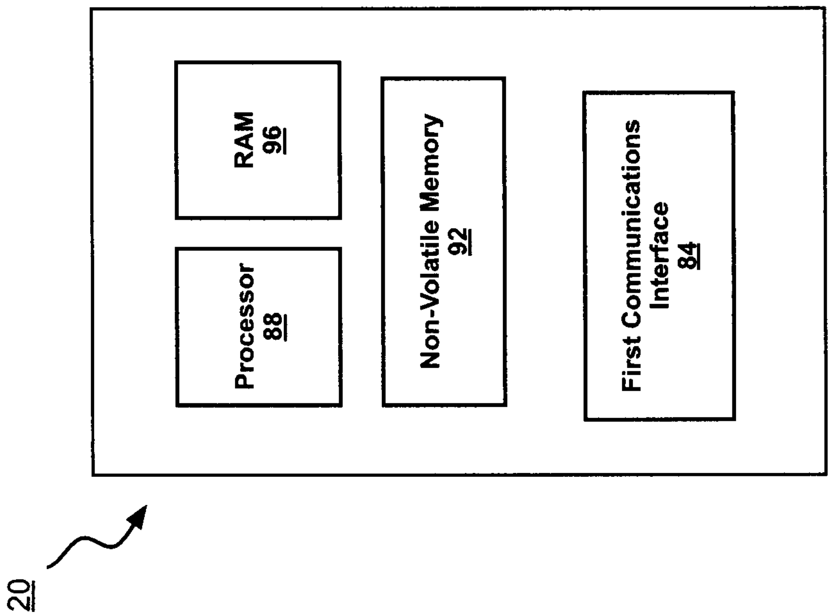
FIG. 3 is a schematic representation of a number of components of the system of FIG. 1.

FIG. 3 shows a number of logical components of the system 20. The system 20 includes a first communications interface 84 for communicating over the Internet 24 with the mobile device 40. A processor 88 executes various programs to provide the functionality required as described herein. Non-volatile memory 92 stores the various programs, and random access memory 96 enables the processor 88 to temporarily store data and programs during their execution.

Figure 4:
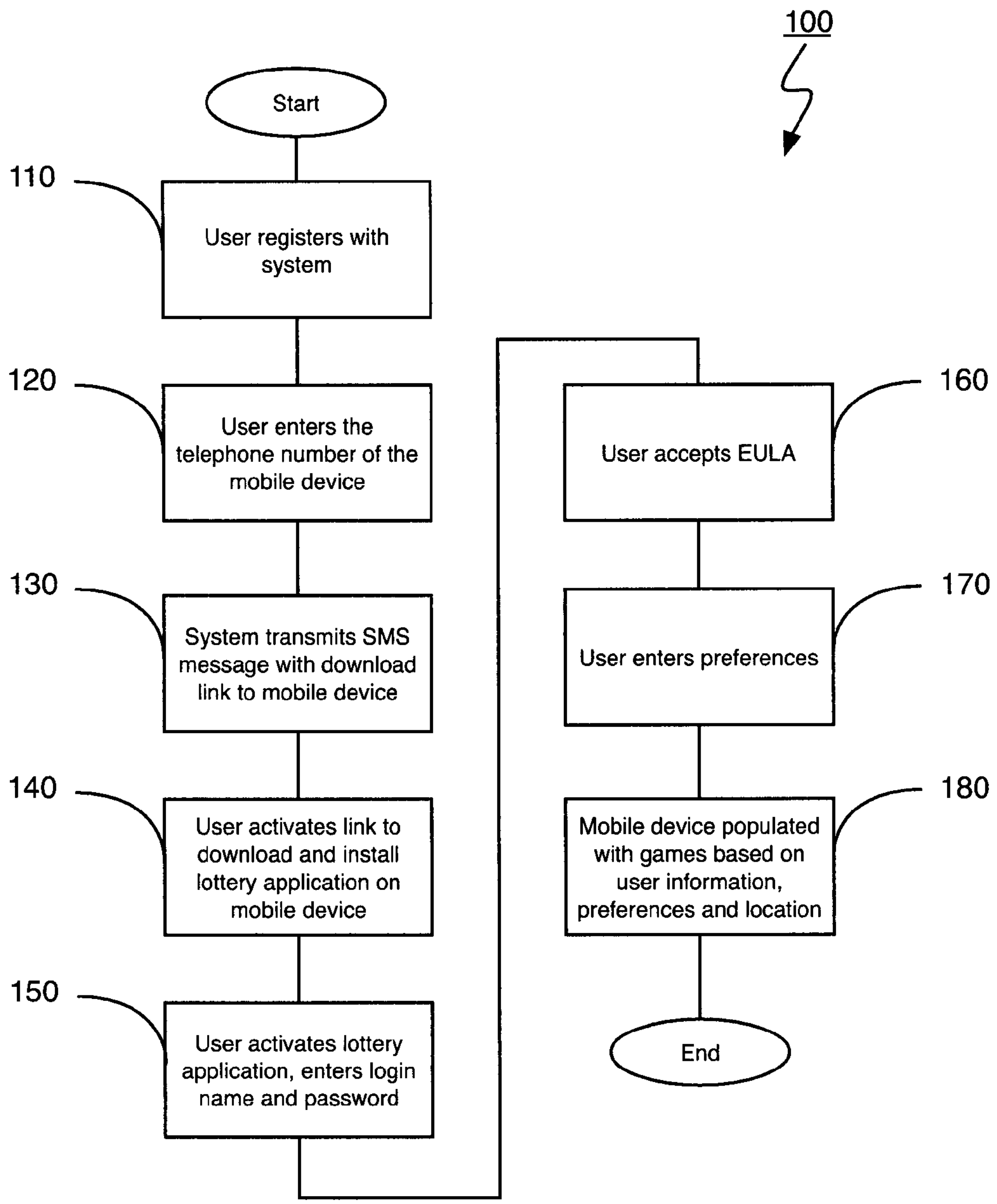
FIG. 4 is a flowchart of the general method of setting up a user to use a mobile device with the system.

FIG. 4 shows the method of setting up a user to use a mobile device 40 with the system 20 generally at 100. In order for a user to use the system 20 via his mobile device 40 to participate in gaming (to purchase lottery tickets, in this embodiment), the user registers with the system 20 (step 110).

Figure 5:
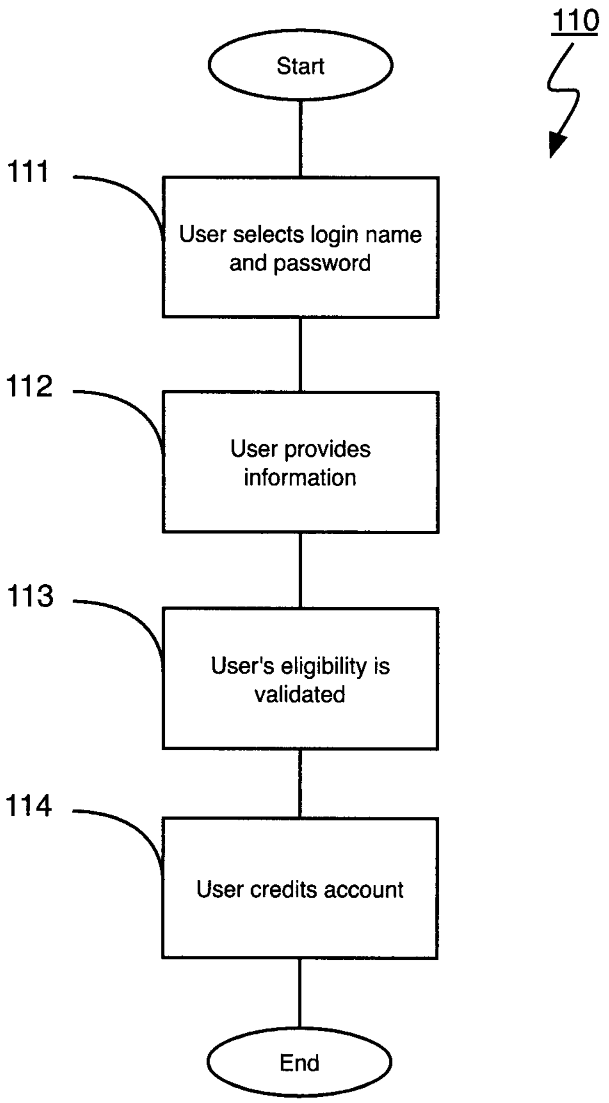
FIG. 5 is a flowchart of the general method of registering to use the system with a mobile device.

FIG. 5 illustrates the method of registering a user with the system 20 in greater detail. In particular, the user visits a web page served by a web-serving component of the system 20 that allows the user to enter in various personal and payment details. First, the user is asked to select a unique login name and a password (step 111). The user is then prompted to enter his name, his address, his birth date or age, his gender and his citizenship (step 112). This information is then used by the system 20 to validate the user's eligibility to use the system 20 (step 113).

The system 20 validates the information provided using various data match sources and then using rules for determining the user's eligibility for games operated in that user's residential jurisdiction or the jurisdiction in which the user is presently located. Some jurisdictions limit game participation to people who satisfy a minimum age and who are, at that time, located in the jurisdiction. For example, Atlantic Lottery Corp. stipulates that anyone playing any of their lottery games is required to be within their provinces at the time of purchase as well be of age. The Ontario Lottery Gaming Commission ("OLGC") stipulates that only residents of Ontario who satisfy a minimum age are able to purchase a lottery ticket. Therefore, it is permissible for a resident of Ontario sitting in his winter home in Florida can buy an OLGC-licenced lottery ticket, but not for a resident of Newfoundland. Likewise, an Ontario resident located in an Atlantic province could buy both OLGC-licenced lottery tickets and Atlantic Lottery Corp.-licensed lottery tickets as they satisfy the requirements for both lottery regulators. To complicate matters, some jurisdictions apply different rules for different games.

Further, some lottery regulators maintain a "no play" list that identify individuals that are known to have a gambling addiction. The system 20 checks the user's name against the appropriate "no play" lists before deeming the user eligible to play. In addition, some lottery regulators can stipulate that the amount spent by a player is to be limited.

Once the user is validated to play one or more games, the user is asked to credit an account against which purchases are debited (step 114). The user selects from one of a variety of payment methods to credit his account. When the user purchases lottery tickets in the future through the system 20, this account is debited.

The information provided by the user is stored in a user database by the system 20.

Referring again to FIG. 4, once the user has registered with the system 20, the user then enters the telephone number of the mobile device 40 which he wishes to use with the system 20 (step 120). The user is prompted for the telephone number of the mobile device 40 via another web page served by the system 20. The system 20 then transmits a short message service ("SMS") message to the mobile device 40 (via the telephone number provided by the user at step 120) that includes a link to download a gaming application (in this case, a lottery application) (step 130). The link includes an identification of that user. The user then activates the link to download and install the lottery application on the mobile device 40 (step 140). The lottery application is installed in the memory 68 of the mobile device 40. When the lottery application is first started by the user, he is asked to enter his login name and password (step 150). The lottery application presents the user the option of saving his login name and password. The user is then presented with and accepts an end-user license agreement ("EULA") (step 160). The EULA includes a provision to permit the system 20 and/or associated parties to obtain information for the purpose of verifying the jurisdiction in which the user is in during operation of the lottery application. Declination of the EULA returns the lottery application to an "unstarted" state, thereby allowing the user to accept the EULA upon a subsequent execution of the lottery application. If, after three tries, the user has failed to acknowledge acceptance of the EULA, the lottery application uninstalls itself from the mobile device 40. A similar EULA is presented to the user when the user registers with the system at step 110. Additionally, changes to the EULA are presented to the user as they become available.

Once the lottery application is installed on the mobile device 40 and the EULA has been accepted, the lottery application presents a list of preferences for the user to confirm or change (step 170). The preferences include whether the user wishes to receive lottery notifications in general, whether audible prompts are to be played when the jackpot is above a user-set level, how often to update a lottery's icon within the lottery application for the jackpot size as the jackpot grows, whether the user wishes to receive notices of lottery results, etc. In addition, the user can select the types of games that he prefers, such as lottery, scratch off, multi-player, sports betting, etc.

The lottery application running on the user's mobile device 40 then, using the user's information, location and preferences, downloads games from the system 20 (step 180). The games for which the user is eligible and match his preferences are then presented to the user on-screen when the application is opened.

The lottery application permits the user to view the various types of lottery tickets available from the system 20 and various details about the lottery jackpots, purchase tickets that he is eligible to purchase, track lottery tickets purchased and receive or process winnings.

Figure 6A:
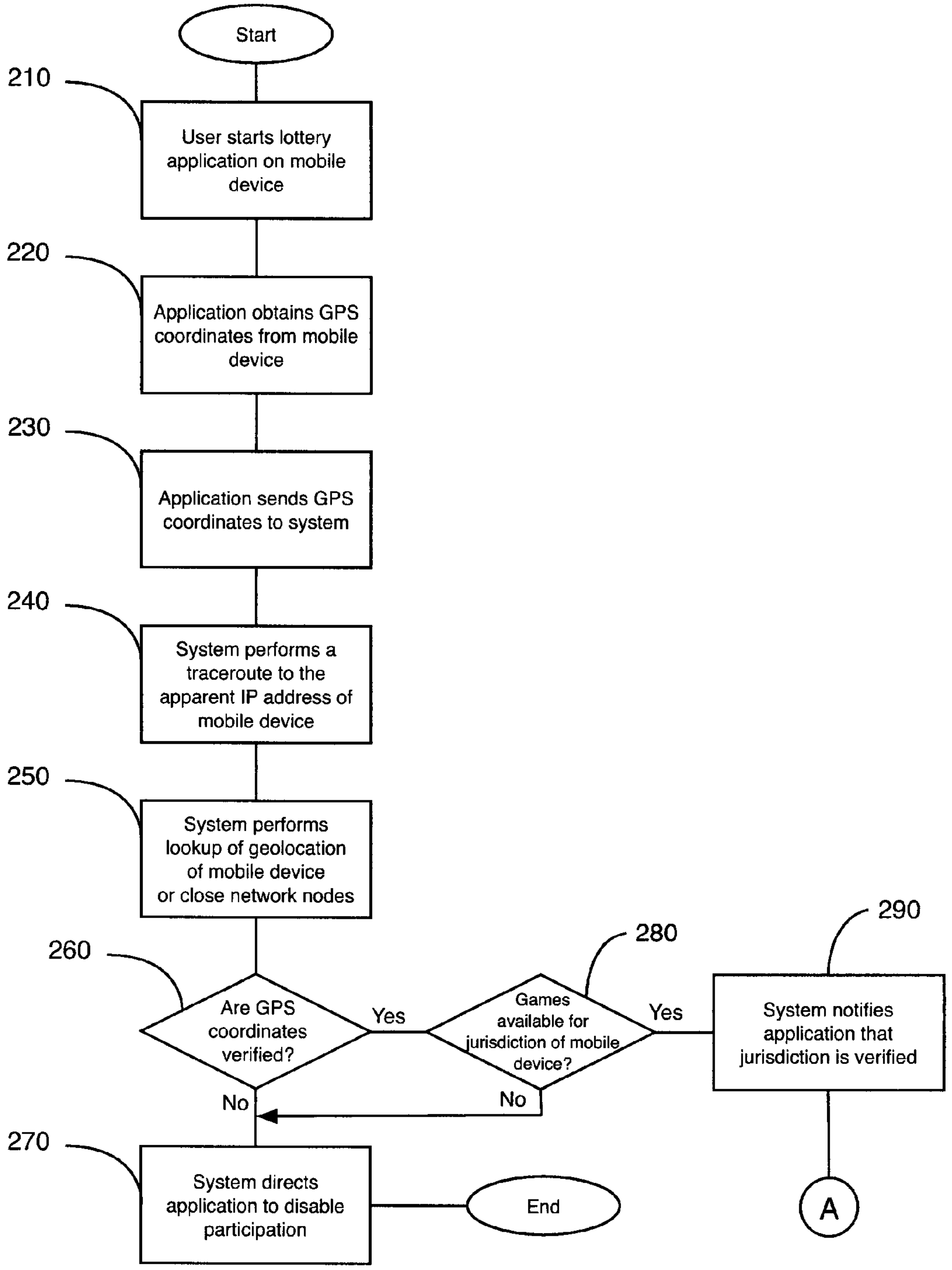
FIGS. 6A and 6B illustrate a flowchart of the general method of enabling gaming via a mobile device used by the system of FIG. 1.
Figure 6B:
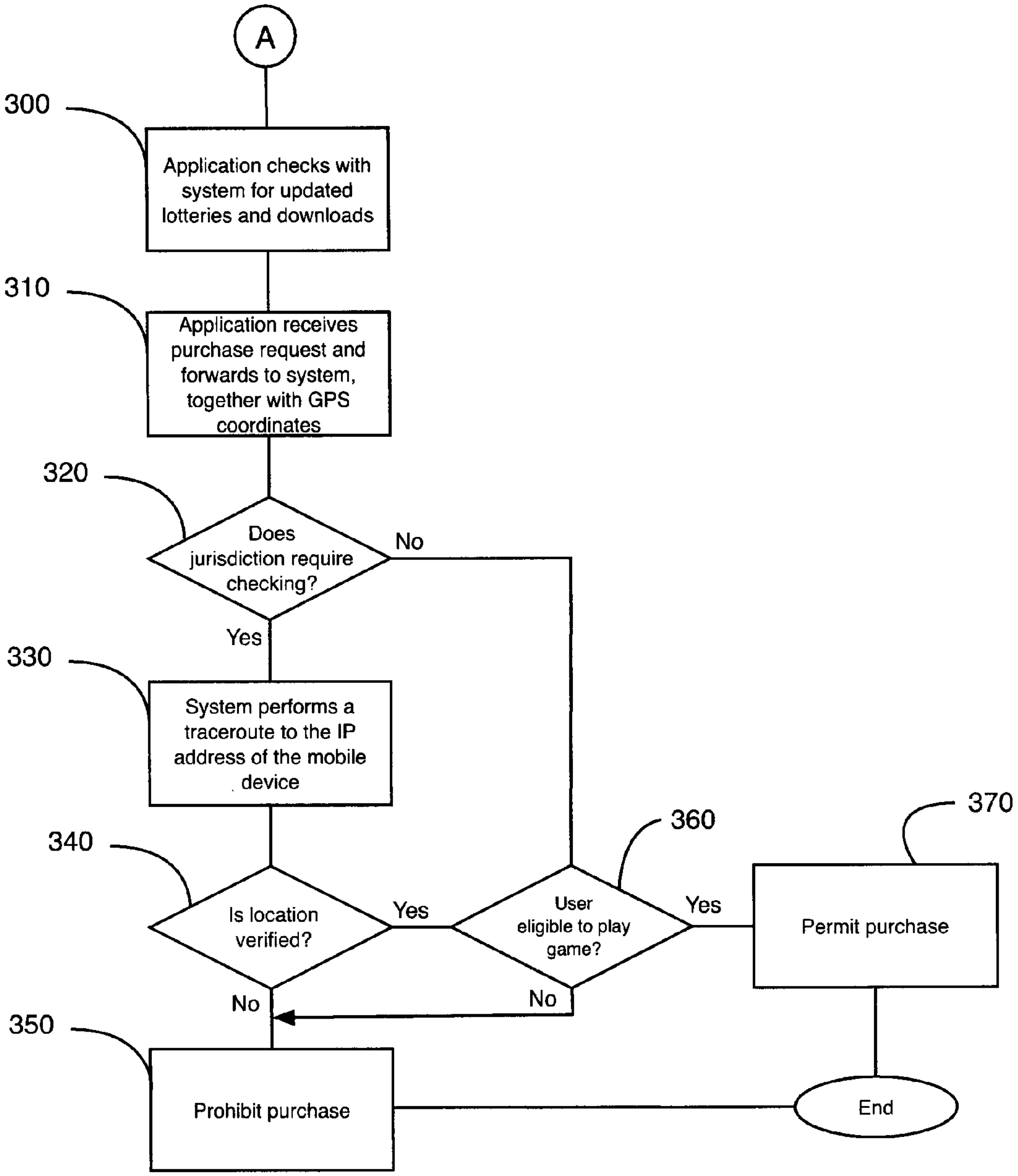

FIGS. 6A and 6B illustrate a flowchart of the general method of enabling gaming via a mobile device. The method commences with the user starting the lottery application on the mobile device 40 (step 210). During startup of the lottery application, the user is prompted for his login name and password. In addition, the lottery application generates a number of quantum random number generator requests for lottery operators corresponding with games presently downloaded onto the mobile device 40. These random numbers are used if the user would like the numbers for a lottery ticket to be randomly selected. The lottery application requests GPS coordinates (i.e., the geolocation) from the mobile device (step 220). In particular, the lottery application makes a request to the operating system of the mobile device 40 to provide the GPS coordinates. The GPS unit 80 receives GPS signals from the GPS satellites 44 and determines the GPS coordinates of the mobile device 40 using signals from GPS satellites 44. The GPS coordinates are reported to the operating system of the mobile device 40 by the GPS unit 80. The operating system then responds to the lottery application with the same GPS coordinates. The GPS coordinates serve as primary location information for the mobile device 40.

Once the lottery application has received the GPS coordinates from the operating system of the mobile device 40, it sends them, along with the login name and password entered by the user, to the system 20 (step 230). The transmission is sent via the cellular communications tower 32*a* to the IP gateway 36*a*. The IP gateway 36*a* translates the request from the mobile device 40 to replace the address of the mobile device 40 with the IP address of the IP gateway 36*a*, and then forwards the request to the system 20.

The system 20 then performs a traceroute on the apparent IP address of the mobile device 40 (step 240). A traceroute is a network tool used to determine the route taken by packets (i.e., data) across an IP-based network, such as the Internet 24. As the IP gateway 36*a* has replaced the address of the mobile device 40 internal to the cellular communications service provider's network with its own IP address as used for the Internet 24, the system 20 in fact performs a traceroute on the IP gateway 36*a* in this case. The traceroute provides a list of the intermediate nodes/switches through which packets to the IP address of the IP gateway 36*a* are being routed.

The system 20 then performs a lookup of the geolocation of the mobile device 40 or close network nodes as identified in the traceroute (step 250). The system 20 has access to the IP localization database 48 that stores IP addresses and known geolocations. As will be understood by those skilled in the art, some IP addresses are dynamic, in that they are assigned by network management systems to devices as needed, and others are "less temporary", in that they are generally assigned permanently to a switch or other network device but can be re-assigned in the future. The IP localization database can be maintained by the system 20 or by a trusted third party and includes the known geolocations for the relatively static IP addresses. The traceroute is used in conjunction with the IP localization database 48B to determine the closest IP address (or hop or network node) for which a geolocation is known, and its geolocation. This geolocation is used as secondary location information by the system 20.

The system 20 then compares the primary location information with the secondary location information to verify the geolocation of the mobile device 40 (step 260). More specifically, the geolocation in the primary location information is compared to the geolocation in the secondary location information to determine if the distance between them is within a desired range. If the distance between the geolocations in the primary and secondary location information is greater than a threshold, the system 20 determines that the primary location information is unverified and sends a communication to the application on the mobile device 40 to disable participation (step 270).

If, instead, the system 20 determines that the primary location information is verified by the secondary location information, the system 20 determines if the jurisdiction corresponding to the primary location information is appropriate for one or more lotteries available through the system 20 (step 280). If the primary location information indicates that the mobile device 40 is in a jurisdiction for which the system 20 does not offer lotteries, the system 20 directs the lottery application executing on the mobile device 40 to disable participation at step 270.

If the primary location information indicates that the mobile device 40 is in a jurisdiction for which the system 20 offers lotteries, the system 20 notifies the application on the mobile device 40 that the jurisdiction is verified (step 290). The application executing on the mobile device 40 then checks with the system 20 for updated lotteries matching the user's information, preferences and location, and downloads any found (step 300). The user is first prompted if he would like to update the games available via the lottery application, and, upon acceptance, the additional games are downloaded. If any of the new games downloaded has conditions that are not covered by the standard EULA, an additional EULA is presented to the user by the lottery application at this time.

The lottery application enables the user to select a lottery, pick numbers (if applicable) and then purchase the ticket. In order to generate a purchase request for the ticket, the user is prompted to enter in his password again.

Upon receiving a purchase request for a lottery ticket on the mobile device 40, the application forwards the request to the system 20, together with the GPS coordinates (step 310). The system 20 then determines if a further jurisdiction check is required (step 320). For some games/lotteries for which location is not a criteria, a further check is not required. For other games/lotteries, the initial location check performed by the mobile device may be sufficient. In these cases, the method proceeds to step 360, described below. For games/lotteries that have location restrictions, if sufficient time has passed since the last check for the mobile device 40 or if the geolocation of the mobile device 40, as evidenced by the GPS coordinates sent by the mobile device 40, has changed by a threshold, the system 20 determines that another jurisdiction check is required at step 320, and the system 20 performs another traceroute to the apparent IP address of the mobile device 40 (step 330). The system 20 then uses the information in the same manner as in step 260 to verify the geolocation of the mobile device 40 (step 340). If the secondary location information generated at step 330 does not match the primary location information (i.e., the GPS coordinates) received at step 310, the system 20 declines the transaction and notifies the lottery application on the mobile device 40 (step 350). If, instead, the secondary location information validates the primary location information, the system 20 determines the jurisdiction of the primary location information (if required for the particular lottery/game) and determines whether the user is eligible to purchase the particular lottery ticket being requested (step 360). In particular, the system 20 determines if the user matches all the particular criteria for the selected lottery, which may include age, location, residency and if the user is not on the "no play" list. If the user is not eligible to purchase the lotter ticket, then the system 20 declines the transaction and notifies the lottery application at step 350. If, instead, the user is eligible to purchase the lottery ticket, then the system 20 completes the purchase transaction, debits the user's account and sends the lottery application confirmation of the sale (step 370). The system 20 also sends the lottery application a two-dimensional bar code.

Once the results of a lottery played by the user are available to the system 20, it determines the results for the user and forwards them to the user's mobile device 40. Based on the preferences set out by the user, the mobile device 40 may present a visual and/or audio notification.

In another embodiment, the lottery application executing on the mobile device 40 has two modes of operation. In a "live" mode, the lottery application functions as described in the previous embodiment. In a "demo" mode, the lottery application enables users to simulate the purchasing of lottery tickets and receive notifications of what they would have won if they had been operating in "live" mode. In "demo" mode, the user is not limited to playing only lotteries for which he is eligible.

In a further embodiment, the user can install the lottery application on the mobile device prior to registering with the system 20. Upon executing the lottery application for the first time, the user is asked for much of the same information as he is asked for in the first embodiment, except that he need not enter in his mobile device telephone number, as the lottery application is already installed on the mobile device.

While, in the above-described embodiments, the primary location information is derived by the mobile device using GPS, those skilled in the art will understand that other methods can be used by the mobile device to determine its location. One such method employs the use of wireless mobile location data to determine the general geolocation of the mobile device. Wireless mobile location data is provided by the cellular communications tower with which the mobile device is in communication and identify the particular tower using a unique identifier. The location of each cellular communications tower is known, as well as the general area that they cover. If the mobile device is in communication with a particular cellular communications tower, the mobile device is assumed to be within the area covered by the cellular communications tower. This area of coverage associated with the cellular communications tower with which the mobile device is communicating can act as the primary location information.

While in the embodiments described above, the known location of relatively permanent network nodes is used to verify the primary location information, those skilled in the art will appreciate that other types of location systems can be employed.

In a particular embodiment, cellular communications tower triangulation is employed to identify the geolocation of the mobile device. Mobile devices are constantly being tracked by cellular communications towers to determine a user's general location in order to pair that mobile device with a particular cellular communications tower for further communications. This is accomplished by determining the relative signal strength of the signal received by three particular cellular communications towers and then triangulating the position as a weighted average distance from each tower. This provides a relatively crude location, but can be sufficient to determine a user's general location, and thus verify the primary location information provided by the mobile device.

In this embodiment, it may be preferable to have the cellular communications service providers operate the system as the cellular communications service providers are reluctant to provide information regarding the location of subscribers. Alternatively, the user, upon registration, can consent to the use of triangulation data by the cellular communications service provider to confirm his location, thus enabling the cellular communications service provider the ability to confirm the location of the user/mobile device. The cellular communications service provider can alternatively be asked to confirm the jurisdiction of the mobile device as determined from the primary location information reported by the mobile device to the system. In this way, the cellular communications provider is only confirming or not confirming the jurisdiction in which the mobile device is located based on the primary location information.

The system can be used to enable other types of gaming such as online casinos and betting.

While the mobile device was described in the above embodiments as having cellular communications capabilities, those skilled in the art will appreciate that other types of mobile devices will work. For example, a GPS-enabled mobile device can communicate with the system via a wireless protocol such as WiFi or the like, with a traceroute being performed by the system to approximate the location of the mobile device by identifying the network node with a known location that is closest to the mobile device along the traced network routing path and using its known location as the estimate for the location of the mobile device.

In some scenarios, the verification of the primary location information with secondary location information can be optional, depending on the circumstances. For example, if a user is a trusted registered user, the verification may not be necessary each time.

Tracking and verification of the geolocation of the mobile device can occur with various frequency or at various times.

The location verification may alternatively be performed only when the application is started up or when a purchase is requested.

The above-described embodiments are intended to be examples of the present invention and alterations and modifications may be effected thereto, by those of skill in the art, without departing from the scope of the invention which is defined solely by the claims appended hereto.

What is claimed is:

1. A method for enabling gaming via a mobile device, comprising:

receiving a request from said mobile device to participate in gaming;

receiving primary location information determined by said mobile device corresponding to a primary geolocation of said mobile device;

verifying whether said primary geolocation based on said self-determined primary location information of said mobile device is a true geolocation of said mobile device comprising the steps of:

determining secondary location information of said mobile device based on an IP address with said mobile device using a location system external to said mobile device to obtain a secondary geolocation of said mobile device;

comparing said self-determined primary location information of said to said externally-determined secondary location information of said mobile device by calculating a distance between said primary geolocation and said secondary geolocation;

when said calculated distance between said primary geolocation and said secondary geolocation is less than a predefined threshold then said primary geolocation as determined by said mobile device is verified as said true geolocation; and when said mobile device is at said true geolocation is eligible for said at least one game, populating said mobile device with at least one game based on said true geolocation; and enabling said mobile device to participate in said at least one game; otherwise denying said mobile device from participating in said game.

2. The method of claim 1, wherein said primary location information is determined by said mobile device using global positioning system satellite signals.

3. The method of claim 1, wherein said primary location information is determined by said mobile device using at least one cellular communications tower with which said mobile device is in communication.

4. The method of claim 1, wherein said secondary location information is determined using cellular communications tower triangulation.

5. The method of claim 1, wherein the secondary location information is determined using the identity and location of a cellular communications tower with which said mobile device is in communication.

6. The method of claim 1, wherein said secondary location information is determined using the location of the first network node along a route through which a communication from said mobile device travels for which the location is known.

7. The method of claim 1, wherein said verifying of said primary location information is optionally performed.

8. The method of claim 1, wherein said enabling is conditional on the age of a user of said mobile device.

9. The method of claim 1, wherein said enabling is conditional on a user of said mobile device being free of addiction to gaming.

10. A system for enabling gaming via a mobile device, comprising: at least one server providing access to a game to users in a jurisdiction, said at least one server having a first communications interface for receiving a request for access to said game from a mobile device, said request including primary location information about the geolocation of said mobile device, and determining secondary location information of said mobile device based on an IP address associated with said mobile device using a location system external to said mobile device; determining a distance between a geolocation associated with said primary location information and a geolocation associated with said secondary location information; said at least one server verifying said primary location information with secondary location information for the location of the mobile device by determining whether said distance is less than a predefined threshold; and when said distance is less than said predefined threshold then said geolocation associated with said primary location information is deemed to be verified and when said mobile device at said verified is eligible for said at least one game populating said mobile device to participate in said at least one game.

11. The system of claim 10, wherein said primary location information is determined by said mobile device using global positioning system satellite signals.

12. The system of claim 10, wherein said primary location information is determined by said mobile device using at least one cellular communications tower with which said mobile device is in communication.

13. The system of claim 10, wherein said secondary location information is determined using cellular communications tower triangulation.

14. The system of claim 10, wherein said secondary location information is determined using the identity and location of a cellular communications tower with which said mobile device is in communication.

15. The system of claim 10, wherein said secondary location information is determined using the location of the first network node along a route through which a communication from said mobile device travels for which the location is known.

16. The system of claim 10, wherein the verification of said primary location is optionally performed by said system.

17. The method of claim 10, wherein said at least one server enables said mobile device to participate in said game conditional on the age of a user of said mobile device.

18. The method of claim 10, wherein said at least one server enables said mobile device to participate in said game conditional on a user of said mobile device being free of addiction to gaming.

19. A method for enabling gaming via a mobile device, comprising: receiving a request from said mobile device to participate in gaming;

receiving primary location information determined by said mobile device for the location of said mobile device, if participation in said gaming is restricted by location;

populating said mobile device with at least one game based on said primary location;

verifying said primary location information with secondary location information for the location of said mobile device determined using a location system external to said mobile device by determining said secondary location information of said mobile device based on an IP address associated with said mobile device;

determining a distance between a geolocation associated with said primary location information and a geolocation associated with said secondary location information, and wherein said primary location information is verified when said distance is less than a predefined threshold; and restricting said mobile device from participating in a game if said predefined threshold is exceeded and if participation in said gaming is restricted by location.

20. The method of claim 19, further comprising: restricting said mobile device from participating in said game if a user of said mobile device is below an age limit.

21. The method of claim 19, further comprising: restricting said mobile device from participating in said game if a user of said mobile device is addicted to gaming.

* * * * *